UNITED STATES PATENT OFFICE.

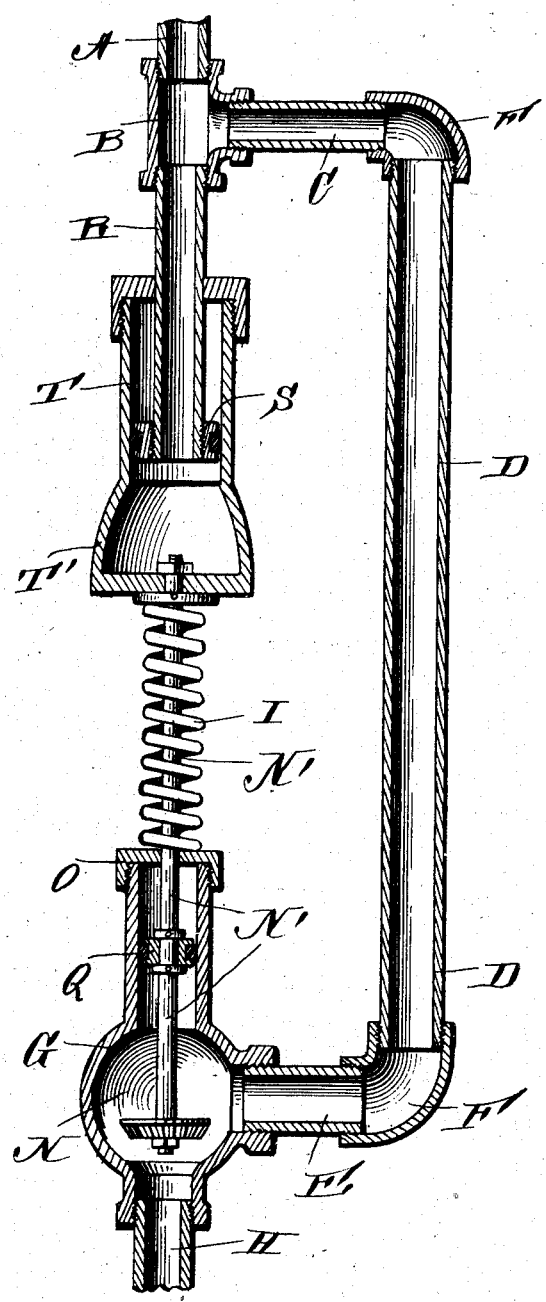

ANDREW J. MOREHART, OF FOSTORIA, OHIO.

FLUID-PRESSURE REGULATOR.

No. 866,503.  Specification of Letters Patent.  Patented Sept. 17, 1907.

Application filed June 22, 1907. Serial No. 380,294.

*To all whom it may concern:*

Be it known that I, ANDREW J. MOREHART, a citizen of the United States, residing at Fostoria, in the county of Seneca and State of Ohio, have invented certain new and useful Improvements in Fluid-Pressure Regulators; and I do hereby declare the following to be a full, clear, and exact description of the invention, such as will enable others skilled in the art to which it appertains to make and use same, reference being had to the accompanying drawings and to the letters and figures of reference marked thereon, which form a part of this specification.

This invention relates to new and useful improvements in fluid pressure regulating apparatus and designed especially for use to regulate the pressure of steam in pipes, pumps, etc., and comprises various details of construction and combinations and arrangements of parts which will be hereinafter fully described and then specifically defined in the appended claims.

I illustrate my invention in the accompanying drawing, in which I have shown a vertical sectional view through the apparatus.

Reference now being had to the details of the drawings by letter, A designates a main, steam or fluid pressure pipe through which steam is conducted from a boiler, not shown, and B is a union connected to said pipe and from which a pipe C leads laterally communicating through a pipe D with the pipe E, said pipes E and C being connected to the pipe D by means of the unions F, and G designates a valve casing communicating with the pipe E and also having a pipe H leading therefrom.

N designates a valve adapted to regulate the entrance from the valve casing G to the pipe H over which it may be seated. Said valve has a stem N′ working through the apertured plug O fitted in said valve casing and also works through a suitably packed gland Q.

A pipe R is fitted to the union B, preferably in alinement with the steam or fluid conveying pipe A, and has a piston S fixed to its lower end, which piston is provided preferably with suitable steam tight rings adapted to snugly fit the inner circumference of the cylinder T which is fixed to the end of the stem N′. It will be noted that the lower portion T′ of said cylinder is enlarged for the purpose of producing a considerable area to the pressure of the steam.

A spring I is mounted upon the stem N′ and bears between the gland Q and the cylinder, the purpose of which spring is to normally hold the valve N unseated under normal pressure.

In operation, steam being introduced through the pipe A is allowed to pass through the pipes C, D, E and H without obstruction and under a certain pressure. When the pressure becomes excessive, the large area of the lower end of the cylinder receiving the excessive pressure will cause the valve N to be seated or partially seated, thereby cutting off the excessive pressure of the steam passing through the pipe H, thereby maintaining a regular pressure of steam passing through the pipe H. As the excessive pressure is reduced upon the cylinder T, the spring I will cause the cylinder to return toward its normal position, thereby allowing the steam to pass unobstructedly through the pipes C, D and H.

What I claim to be new is:—

1. A fluid pressure regulating apparatus, comprising a main supply pipe, a laterally extending branching pipe therefrom, a valve casing communicating with said laterally extending pipe, a valve in said casing adapted to seat over an exit opening therein, a pipe communicating with the main supply pipe, a stationary piston upon said pipe which is connected to the supply pipe, a spring pressed cylinder in which said piston is mounted and a piston stem connecting said cylinder and valve, as set forth.

2. A fluid pressure regulating apparatus, comprising a main supply pipe, a laterally extending branching pipe therefrom, a valve casing communicating with said laterally extending pipe, a valve in said casing adapted to seat over an exit opening therein, a pipe having communication with the supply pipe, a stationary piston upon said pipe which is connected to the supply pipe, a movable cylinder in which said piston is mounted, a piston stem connecting said cylinder and valve and a spring upon said stem and bearing between said cylinder and casing, as set forth.

3. A fluid pressure regulating apparatus, comprising a main supply pipe, a laterally extending branching pipe therefrom, a valve casing communicating with said laterally extending pipe, a valve in said casing adapted to seat over an exit opening therein, a pipe having communication with the supply pipe, a stationary piston upon said pipe which is connected to the supply pipe, a movable cylinder in which said piston is mounted, said cylinder having one end thereof outwardly flaring, a piston stem connecting said cylinder with said valve and a spring upon said stem bearing between the casing and the flaring end of the cylinder, as set forth.

In testimony whereof I hereunto affix my signature in the presence of two witnesses.

ANDREW J. MOREHART.

Witnesses:
 JOS. GABRIEL,
 A. W. AYLSWORTH.